(12) United States Patent
Amthor et al.

(10) Patent No.: US 12,348,037 B2
(45) Date of Patent: Jul. 1, 2025

(54) CONTROL APPARATUS AND METHOD FOR CONTROLLING A POWER CONSUMPTION AND/OR A POWER OUTPUT OF AN ENERGY SYSTEM, AND LOW-VOLTAGE NETWORK

(71) Applicant: Siemens Aktiengesellschaft, Munich (DE)

(72) Inventors: Arvid Amthor, Grabfeld OT Nordheim (DE); Michael Metzger, Markt Schwaben (DE); Stefan Niessen, Erlangen (DE); Sebastian Schreck, Nuremberg (DE); Sebastian Thiem, Neustadt an der Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 639 days.

(21) Appl. No.: 17/603,511

(22) PCT Filed: Feb. 26, 2020

(86) PCT No.: PCT/EP2020/054964
§ 371 (c)(1),
(2) Date: Oct. 13, 2021

(87) PCT Pub. No.: WO2020/211998
PCT Pub. Date: Oct. 22, 2020

(65) Prior Publication Data
US 2022/0224111 A1    Jul. 14, 2022

(30) Foreign Application Priority Data
Apr. 17, 2019   (EP) .................................... 19169863

(51) Int. Cl.
*H02J 3/00*   (2006.01)

(52) U.S. Cl.
CPC .............. *H02J 3/003* (2020.01); *H02J 3/004* (2020.01); *H02J 2203/10* (2020.01); *H02J 2300/24* (2020.01); *H02J 2310/12* (2020.01)

(58) Field of Classification Search
CPC ........ H02J 3/003; H02J 3/004; H02J 2203/10; H02J 2300/24; H02J 2310/12; H02J 3/381;
(Continued)

(56) References Cited

U.S. PATENT DOCUMENTS

2006/0195229 A1*   8/2006   Bell .......................... H02J 3/00
                                                                700/286
2007/0228999 A1*  10/2007   Kit .......................... H05B 45/10
                                                                315/291
(Continued)

FOREIGN PATENT DOCUMENTS

CN   103460543 A   12/2013   ................ H02J 3/14
CN   104704699 A    6/2015   ................ H02J 3/14
(Continued)

OTHER PUBLICATIONS

Korean Office Action, Application No. 20217037088, 4 pages, May 2, 2023.
(Continued)

*Primary Examiner* — Ziaul Karim
(74) *Attorney, Agent, or Firm* — Slayden Grubert Beard PLLC

(57) ABSTRACT

Various embodiments include a control apparatus for controlling a power consumption and/or a power output of an energy system via a network connection point of a low-voltage network, wherein a line voltage can be detected at the network connection point by the control apparatus. The control apparatus comprises a processor programmed to reduce the power consumption and/or to increase the power
(Continued)

output if the line voltage is below a first threshold value and/or to increase the power consumption and/or to reduce the power output if the line voltage is above a second threshold value greater than the first threshold value.

7 Claims, 1 Drawing Sheet

(58) Field of Classification Search
CPC ............... H02J 2300/20; H02J 2310/14; H02J 2310/60; H02J 3/14; Y02B 70/30; Y02B 70/3225; Y04S 20/242; Y04S 20/222; Y02E 10/56
See application file for complete search history.

(56) References Cited

U.S. PATENT DOCUMENTS

| | | | | |
|---|---|---|---|---|
| 2009/0139781 | A1* | 6/2009 | Straubel | B60L 53/14 |
| | | | | 701/22 |
| 2009/0310389 | A1* | 12/2009 | Balakrishnan | H02M 3/33507 |
| | | | | 363/21.15 |
| 2011/0304394 | A1* | 12/2011 | Bult | H03F 3/24 |
| | | | | 330/253 |
| 2012/0126995 | A1* | 5/2012 | Sobotka | H04B 3/546 |
| | | | | 340/870.03 |
| 2013/0326254 | A1* | 12/2013 | Lorin | G06F 1/3234 |
| | | | | 713/323 |
| 2014/0117781 | A1* | 5/2014 | Kesten-Kuhne | H02J 3/14 |
| | | | | 307/130 |
| 2016/0141879 | A1* | 5/2016 | Motsenbocker | G05F 1/67 |
| | | | | 307/130 |
| 2016/0172853 | A1* | 6/2016 | Eckert | H02J 3/00 |
| | | | | 307/52 |

FOREIGN PATENT DOCUMENTS

| | | | |
|---|---|---|---|
| CN | 106712039 A | 5/2017 | ................ H02J 3/02 |
| CN | 109038680 A | 12/2018 | ................ H02J 3/32 |
| DE | 10 2015 101 738 | 8/2016 | ................ H02J 3/00 |
| JP | 2008263706 A | 10/2008 | ............. H02J 13/00 |
| JP | 5761476 B2 | 8/2015 | ............. G06Q 10/04 |
| JP | 2017 103868 | 6/2017 | ................ H02J 3/38 |

OTHER PUBLICATIONS

Chinese Office Action, Application No. 202080028590.2, 25 pages, Aug. 9, 2023.
Search Report for International Application No. PCT/EP2020/054964, 12 pages, Jun. 2, 2020.
Search Report for EP Application No. 19169863.8, 22 pages, Oct. 17, 2019.
Collins L et al: "Real and reactive power control of distributed PV inverters for overvoltage prevention and increased renewable generation hosting capacity", Renewable Energy, vol. 81, pp. 464-471, XP029157577, ISSN: 0960-1481, DOI: 10.1016/J.RENENE, Apr. 5, 2015.

* cited by examiner

CONTROL APPARATUS AND METHOD FOR CONTROLLING A POWER CONSUMPTION AND/OR A POWER OUTPUT OF AN ENERGY SYSTEM, AND LOW-VOLTAGE NETWORK

CROSS-REFERENCE TO RELATED APPLICATIONS

This application is a U.S. National Stage Application of International Application No. PCT/EP2020/054964 filed Feb. 26, 2020, which designates the United States of America, and claims priority to EP Application No. 19169863.8 filed Apr. 17, 2019, the contents of which are hereby incorporated by reference in their entirety.

TECHNICAL FIELD

The present disclosure relates to low-voltage networks. Various embodiments of the teachings herein may include a control apparatus, a method, and/or a low-voltage network.

BACKGROUND

An energy supply system typically has connection participants which are connected to a power distribution network of the energy supply system via a network connection (point of common coupling, abbreviated: PCC). The connection participants are typically energy systems, for example industrial installations, private and/or commercial apartment buildings. After the network connection point, each energy system has different energetic installations for generating, consuming and/or storing electrical energy. For example, the energy system may be in a private apartment building with a photovoltaic installation.

If electrical power or energy is consumed and/or generated within the energy system, the voltage at the network connection point would change. Nevertheless, an operator of the power distribution network has an obligation to keep the line voltage within certain tolerances. For example, in Germany, the line voltage of low-voltage networks (single phase) must have a value between 207 V and 253 V (VDE AR-N 4100). In this case, the standard voltage, i.e. the set point of the line voltage, is 230 V. Moreover, maximum permissible thermal limiting currents of the operating means of the low-voltage network must not be exceeded. In particular with regard to renewable energies and their feed-in by way of a plurality of energy systems, said limits may be violated if no further methods coordinate the feed-in or the consumption of the energy systems.

In the case of a low-voltage network, staying within the limits of the line voltage may be ensured by directly influencing the components of the respective energy system, by network connection conditions and/or by using appropriate technical operating means. If, for example, the line voltage drops significantly, individual components of the energy system, for example heat pumps, can be switched off by means of a ripple control signal. An increased line voltage may typically be attributed to a feed-in of renewably generated energies. In this case, currently, the nominal power of the associated installation, for example a photovoltaic installation, is limited by the network connection conditions and/or a fixed ratio between active power and reactive power is specified, for example by a fixed phase shift angle of cos φ=0,9.

One further possibility for solving said problem concerning the line voltage for low-voltage networks is to use technical operating means, such as controllable local network stations, for example, which can be dynamically adjusted to the respective line voltage at a line. However, these operating means are associated with high effort and costs. The aforementioned methods have in common that the operator of the low-voltage network must always take measures to maintain the line voltage.

SUMMARY

The teachings of the present disclosure provide an improved control of a line voltage of a low-voltage network. For example, some embodiments include a control apparatus (42) for controlling a power consumption and/or a power output of an energy system (6) via a network connection point (4) of a low-voltage network (2), wherein a line voltage can be detected at the network connection point (4) by means of the control apparatus (42), characterized in that the control apparatus (42) is designed to reduce the power consumption and/or to increase the power output if the line voltage is below a first threshold value (421); and/or to increase the power consumption and/or to reduce the power output if the line voltage is above a second threshold value (422) which is greater than the first threshold value (421).

In some embodiments, the power consumption is variable according to $P_{in}(u(t))=\overline{P}_{in}[1+f_{in}(u(t)-u_0)]$, wherein u(t) identifies the detected line voltage, $u_0$ a set point of the line voltage, $\overline{P}_{in}$ an average power consumption (420), and $f_{in}$ a characteristic curve (423) of the control, and $f_{in}(u(t)-u_0)<0$ if the line voltage is below the first threshold value (421), and $f_{in}(u(t)-u_0)>0$ if the line voltage is above the second threshold value (422).

In some embodiments, the power output is variable according to $P_{out}(u(t))=\overline{P}_{out}\cdot[1-f_{out}(u(t)-u_0)]$, wherein u(t) identifies the detected line voltage, $u_0$ a set point of the line voltage, $\overline{P}_{out}$ an average power output, and $f_{out}$ a characteristic curve (423) of the control, and $f_{out}(u(t)-u_0)<0$ if the line voltage is below the first threshold value (421), and $f_{out}(u(t)-u_0)>0$ if the line voltage is above the second threshold value (422).

In some embodiments, the power consumption and/or power output is variable according to $P_{in/out}(u(t))=\overline{P}_{in/out}[1-\text{sgn}(P_{in/out})\cdot f_{in/out}(u(t)-u_0)]$, wherein u(t) identifies the detected line voltage, $u_0$ a set point of the line voltage, $\overline{P}_{in}$ an average power consumption (420), and $f_{in/out}$ a respective characteristic curve (423) of the control, wherein in each case $f_{in/out}(u(t)-u_0)=-F_1\ \Theta(u_1-u(t))+F_2\ \Theta(u(t)-u_2)$, and $F_1$ and $F_2$ are constant and greater than zero.

As another example, some embodiments include a method for controlling a power consumption and/or a power output of an energy system (6) via a network connection point (4) of a low-voltage network (2) in which a line voltage of the low-voltage network (2) is detected at the network connection point (4), characterized by the following steps: reducing the power consumption and/or increasing the power output if the line voltage is below a first threshold value (421); and/or increasing the power consumption and/or reducing the power output if the line voltage is above a second threshold value (422) which is greater than the first threshold value (421).

In some embodiments, the power consumption is changed according to $P_{in}(u(t))=\overline{P}_{in}\cdot[1+f_{in}(u(t)-u_0)]$ wherein u(t) identifies the detected line voltage, $u_0$ a set point of the line voltage, $\overline{P}_{in}$ an average power consumption (420), and $f_{in}$ a characteristic curve (423) of the control, and $f_{in}(u(t)-u_0)<0$ if the line voltage is below the first threshold value (421), and $f_{in}(u(t)-u_0)>0$ if the line voltage is above the second threshold value (422).

In some embodiments, the power output is changed according to $P_{out}(u(t))=\overline{P}_{out}\cdot[1-f_{out}(u(t)-u_0)]$, wherein $u(t)$ identifies the detected line voltage, $u_0$ a set point of the line voltage, $\overline{P}_{out}$ an average power output (420), and $f_{out}$ a characteristic curve of the control, wherein $f_{out}(u(t)-u_{Soll})<0$ if the line voltage is below the first threshold value (421), and $f_{out}(u(t)-u_0)>0$ if the line voltage is above the second threshold value (422).

In some embodiments, the power consumption and/or power output is changed according to $P_{in/out}(u(t))=\overline{P}_{in/out}\cdot[1-\text{sgn}(P_{in/out})\cdot f_{in/out}(u(t)-u_0)]$, wherein $u(t)$ identifies the detected line voltage, $u_0$ a set point of the line voltage, $\overline{P}_{in}$ an average power consumption (420), and $f_{in/out}$ a respective characteristic curve (423) of the control, wherein in each case $f_{in/out}(u(t)-u(t)-u_0)=-F_1\,\Theta(u_1-u(t))+F_2\,\Theta(u(t)-u_2)$, and $F_1$ and $F_2$ are constant and greater than zero.

In some embodiments, the power consumption and/or the power output is controlled in such a way that the amount of energy which is exchanged via the network connection point (4) within a time range is equal to a specified amount of energy.

As another example, some embodiments include a low-voltage network (2), comprising at least one network connection point (4) for an energy system (6), characterized in that it comprises a control apparatus (42) as described herein.

In some embodiments, the control apparatus (42) is arranged at the network connection point (4) of the energy system (6).

BRIEF DESCRIPTION OF THE DRAWINGS

Further advantages, features, and details of the teachings herein are set forth in the exemplary embodiments described hereinafter as well as by means of the drawings. In this case, the drawings are schematic and therein.

DETAILED DESCRIPTION

Figure 1:
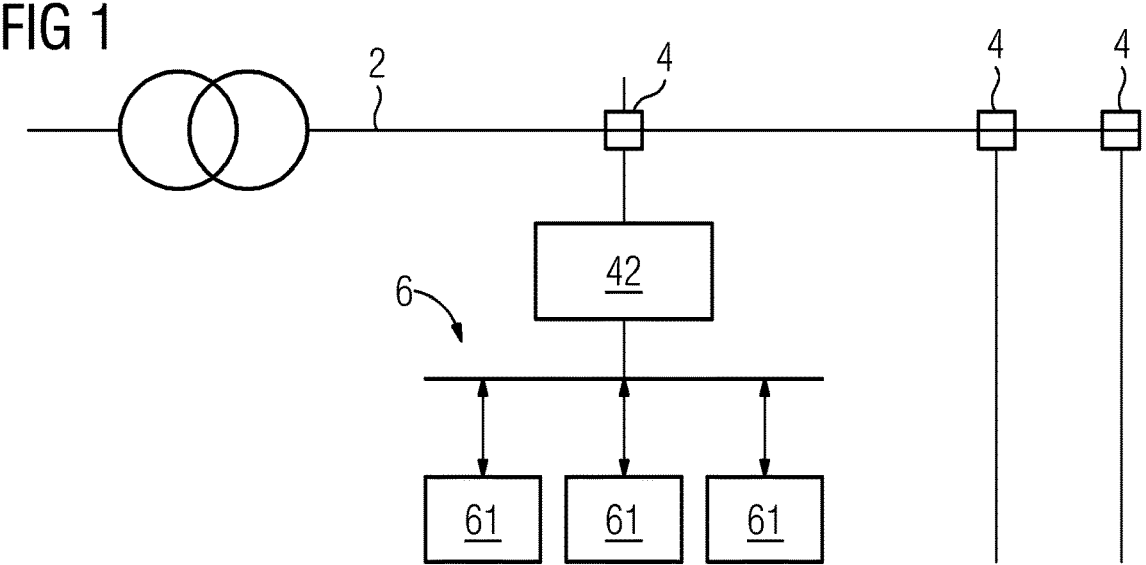
FIG. 1 shows an energy system which is connected to a low-voltage network.

A line voltage can be detected at the network connection point using a control apparatus as described herein for controlling a power consumption and/or a power output of an energy system via a network connection point of a low-voltage network. In some embodiments, the control apparatus is designed to reduce the power consumption and/or to increase the power output if the line voltage is below a first threshold value; and/or to increase the power consumption and/or to reduce the power output if the line voltage is above a second threshold value which is greater than the first threshold value.

A power consumption and/or power output within a time range results in a corresponding absorbed or emitted amount of energy in this time range. In this respect, the terms power and energy are equivalent in the present disclosure.

In some embodiments, the line voltage is time dependent and is therefore detected currently, for example continuously or in discrete time steps. The control takes place depending on the detected current value of the line voltage. In this case, controlling includes regulating. The control of the line voltage via the power consumption and/or power output of the energy system is possible, since it is a low-voltage network in which the line voltage is largely determined by the exchanged active power.

The network connection point is the region within which the energy system is coupled with the low-voltage network for exchanging power and/or energy (PCC). The network connection point can also be referred to as a linking point. Moreover, the control can be provided for a plurality of energy systems, wherein each of the energy systems is connected to the low-voltage network by means of a network connection point for exchanging power (power consumption and/or power output).

A normal range of the line voltage is characterized or limited by the first and second threshold value. In other words, the normal range is characterized by the voltage range $[u_1,u_2]$, wherein $u_1$ indicates the first threshold value of the line voltage and $u_2$ the second threshold value of the line voltage with $u_1<u_2$. A set point of the line voltage, for example 230 V, can be indicated with $u_0$ and is arranged within the normal range $[u_1,u_2]$. In this case, $u_1=u_0-\Delta u$ and $u_2=u_0+\Delta u$, whereby a normal range of the line voltage which is symmetrical about the set point of the line voltage is formed. This has the variable $2\Delta u$. For example, according to VDE AR-N 4100, the set point of the line voltage is $u_0=230V$ with $\Delta u=23V$, such that the normal range of the line voltage extends from 207 V to 253 V in this case.

In some embodiments, the power consumption and/or the power output of the energy system is thus dynamically changed depending on the line voltage, i.e. increased or reduced, at least within a specific period. In some embodiments, the power consumption of the energy system is reduced if the line voltage is below the first threshold value. In other words, the low-voltage network has such a heavy load that the line voltage drops below the first threshold value. The low-voltage network can be discharged by way of the inventive reduction of the power consumption. This makes it possible to prevent a further drop in the line voltage.

In some embodiments, the power output of the energy system is increased if the line voltage is below the first threshold value. As a result, the low-voltage network can also be supported in such a way that the drop in the line voltage can at least be reduced and ideally stopped or prevented.

In some embodiments, the power consumption of the energy system can be increased if the line voltage is above the second threshold value which is greater than the first threshold value. In other words, the low-voltage network has such a low load that the line voltage rises above the second threshold value. The low-voltage network can be charged by way of the increase of the power consumption. This makes it possible to prevent a further increase in the line voltage.

In some embodiments, the power output of the energy system is reduced if the line voltage is above the second threshold value. As a result, the low-voltage network can also be supported in such a way that the increase in the line voltage can at least be reduced and ideally stopped or prevented.

In some embodiments, a change in the line voltage with respect to its set point can be prevented. As a result, the line voltage ideally returns to its normal range. For this purpose, the control apparatus forms a measuring apparatus for detecting the (current) line voltage, as well as a control and/or regulating apparatus with respect to the power consumption and/or power output of the energy system.

In some embodiments, the energy system or rather its power consumption and/or power output is controlled in an integrated manner. A control at the component level, for example switching off heat pumps or shutting down photovoltaic installations, is therefore not required. However, provision can additionally be made for a control of this type of the individual components. Moreover, flexibilities, for example storing and/or temporarily storing energy, within the energy system can be used in an improved manner as a result.

Moreover, owing to the local control, technically complex and costly operating means of the low-voltage network can be dispensed with for controlling/regulating its line voltage. In particular, additional communication interfaces between the energy system or the energy systems and a control/regulation of the low-voltage network are not required.

In some embodiments, supply agreements concerning the consumption and/or the feed-in of a specific amount of energy can be fulfilled. This is the case since the amount of energy results from the temporally integrated power consumption and/or power output. As a result, the power consumption and/or power output can be adapted or changed as required, provided that the integral over the power consumption and/or power output is constant and equal to the amount of energy which is to be consumed or supplied.

In some embodiments, a line voltage of the low-voltage network is detected at the network connection point. The method is characterized at least by the following steps:
  reducing the power consumption and/or increasing the power output if the line voltage is below a first threshold value; and/or
  increasing the power consumption and/or reducing the power output if the line voltage is above a second threshold value which is greater than the first threshold value.

In some embodiments, the low-voltage network comprises a control apparatus and/or one of its configurations. In this case, the control apparatus may be arranged at the network connection point of the energy system. There are similar and equivalent advantages of the low-voltage network in connection with the control apparatus.

In some embodiments, the power consumption is variable according to $P_{in}(u(t))=\overline{P}_{in} \cdot [1+f_{in}(u(t)-u_0)]$, wherein $u(t)$ identifies the detected line voltage, $u_0$ a set point of the line voltage, $\overline{P}_{in}$ an average power consumption, and $f_{in}$ a characteristic curve of the control, and $f_{in}(u(t)-u_0)<0$ if the (detected) line voltage is below the first threshold value, and $f_{in}(u(t)-u_0)>0$ if the (detected) line voltage is above the second threshold value.

In other words, the power consumption may be controlled in the range around the average power consumption according to the characteristic curve. The average power consumption can be characterized by an amount of energy $E_T$ which is to be supplied within a time interval T, i.e. $\overline{P}_{in}=E_T/T$. Moreover, the index in indicates a power flow into the energy system, i.e. a power consumption of the energy system. The characteristic curve $f_{in}$ depends functionally on the difference between the line voltage $u(t)$ measured at the time t and the set point $u_0$. In this case, a multiplicity of functional dependencies can in principle be provided. The characteristic curve $f_{in}$ thus essentially identifies the control/regulation.

In some embodiments, characteristic curve $f_{in}$ is characterized by $f_{in}(u(t)-u_0)=-F_1$ if $u(t)\leq u_1$, $f_{in}(u(t)-u_0)=0$ if $u_1<u(t)<u_2$, and $f_{in}(u(t)-u_0)=F_2$ if $u(t)\geq u_2$, wherein in this case $F_1$ and $F_2$ are constant and greater than zero. In other words, the power consumption of the energy system $P_{in}$ in the range $u(t)\leq u_1$ is reduced or decreased to $P_{in}=\overline{P}_{in}(1-F_1)$, in the range $u(t)\geq u_2$ is increased to $P_{in}=\overline{P}_{in}(1+F_2)$, and in the range $u_1<u(t)<u_2$ is left unchanged at $P_{in}=\overline{P}_{in}$. In other words, $f_{in}(u(t)-u_0)=-F_1 \, \Theta(u_1-u(t))+F_2 \, \Theta(u(t)-u_2)$, wherein $\Theta$ indicates the Heaviside function which is defined by $\Theta(x)=0$ for $x<0$ and $\Theta(x)=1$ for $x\geq 0$. If a fixed or specific supply energy or amount of energy is provided within a period T, the characteristic curve must meet the condition $\int_T f_{in}(u(t)-u_0)dt=0$. This condition can imply a link between $F_1$ and $F_2$ Preferably, $F_1=F_2$.

In some embodiments, the power output is variable according to $P_{out}(u(t))=\overline{P}_{out}\cdot[1-f_{out}(u(t)-u_0)]$, wherein $u(t)$ identifies the detected line voltage, $u_0$ a set point of the line voltage, $\overline{P}_{out}$ an average power output, and $f_{out}$ a characteristic curve of the control, and $f_{out}(u(t)-u_0)<0$ if the (detected) line voltage is below the first threshold value, and $f_{out}(u(t)-u_0)>0$ if the (detected) line voltage is above the second threshold value.

In some embodiments, the power output may be controlled in the range around the average power output according to the characteristic curve. The average power output can be characterized by an amount of energy $E_T$ which is to be supplied within a time interval T, i.e. $\overline{P}_{out}=E_T/T$. Moreover, the index out indicates a power flow from the energy system into the low-voltage network, i.e. a power output of the energy system. The characteristic curve $f_{out}$ depends functionally on the difference between the line voltage $u(t)$ measured at the time t and the set point $u_0$. In this case, a multiplicity of functional dependencies can in principle be provided. The characteristic curve $f_{out}$ thus essentially identifies the control/regulation.

In some embodiments, characteristic curve $f_{out}$ for the power output is also specified by the characteristic curve already discussed and described for the case of power consumption. In other words, $f_{out}(u(t)-u_0)=F_1 \, \Theta(u_1-u(t))+F_2 \, \Theta(u(t)-u_2)$ may be used in this case. The difference between a power output and a power consumption in this case manifests itself in the different sign in the equations for $P_{out}$ or $P_{in}$. To summarize, the common equation for controlling/regulating $P_{in/out}(u(t))=\overline{P}_{in/out}\cdot[1-\mathrm{sgn}(P_{in/out})\cdot f_{in/out}(u(t)-u_0]$ can be used for a power consumption and a power output, wherein in this case, the power consumption $P_{in}$ is considered positive and the power output $P_{out}$ negative with respect to the energy system. In other words, $\mathrm{sgn}(P_{in})=1$ and $\mathrm{sgn}(P_{out})=-1$. In some embodiments, $f_{in}=f_{out}$. Nevertheless, in principle, different characteristics curves can be provided for the power consumption and power output. It is essential that an agreed amount of energy is also adhered to by varying or changing the power. In other words, in the case of an agreed amount of energy E, $E=\int_T P(t)dt$ must always be met, irrespective of a power consumption or power output. In this case, $P(t)$ indicates the current signed power which assumes positive values for a power consumption and negative values for a power output.

In some embodiments, the control the power consumption and/or the power output in such a way that the amount of energy which is exchanged via the network connection point within a time range is equal to a specified amount of energy. As a result, the specified amount of energy which is exchanged within the time range T, for example, may be adhered to. However, a network supporting and local control/regulation of the line voltage can take place via the power exchange.

Elements which are similar, equivalent or have the same effect can be provided with the same reference numbers in the figures. FIG. 1 shows a schematic energy system 6 which is connected to a low-voltage network 2 via a network connection point 4 for exchanging power and/or energy.

In some embodiments, the low-voltage network 2 is an electrical distribution network which has a nominal voltage (set point) of 230 V (single phase), for example. The line voltage is the current electrical voltage of the low-voltage network 2 which typically varies around its set point. In some embodiments, the set point of the line voltage is 400 V (three phase). The set point of the low-voltage network 2 can be up to 1000 V. Further set points of the line voltage can be provided, in particular outside of Germany or Europe. In some embodiments, the power exchange between the energy system 6 and the low-voltage network 2 is largely determined by the active power, so that the set point of the line voltage is secondary to identifying whether a low-voltage network 2 is present as defined. Moreover, FIG. 1 represents a plurality of network connection points 4 for further energy systems which are not represented.

In some embodiments, the energy system 6 can have a plurality of components 61, in particular energy technology installations. For example, the energy system 6 is a private apartment building with at least one heat pump and a photovoltaic installation as components 61 or energy technology installations. In this case, power and/or energy is exchanged via the network connection point 4. In other words, the energy system 6, for example its heat pump, consumes electrical energy and feeds electrical energy which has been generated by means of the photovoltaic installation into the low-voltage network 2 via the network connection point 2.

In some embodiments, a control apparatus 42 is configured to control the power and/or energy exchange between the energy system 6 and the low-voltage network 2 depending on the line voltage of the low-voltage network 2. In this case, the concept of controlling includes regulating. Moreover, the control apparatus 42 is designed to detect the line voltage or rather its current value.

In some embodiments, the control apparatus 42 is designed to reduce the power consumption of the energy system 6 depending on the detected line voltage if the line voltage is below a first threshold value. Moreover, the control apparatus 42 is designed to increase the power output of the energy system 6 depending on the detected line voltage if the line voltage is below the first threshold value.

In some embodiments, the control apparatus 42 is designed to increase the power consumption of the energy system depending on the detected line voltage if the line voltage is above a second threshold value which is greater than the first threshold value. Moreover, the control apparatus 42 is designed to reduce the power output of the energy system depending on the detected line voltage if the line voltage is above the second threshold value.

In some embodiments, the power exchange between the low-voltage network 2 and the energy system 6 is controlled by means of the control apparatus 42 depending on the detected line voltage in such a way that a departure of the line voltage from a normal range which is limited by the threshold values is prevented. For example, the set point of the line voltage is 230 V, the first threshold value is 207 V and the second threshold value is 253 V. If a line voltage below and/or at 207 V is detected, the power output of the energy system 6 is reduced and/or the power output of the energy system 6 is increased. If a line voltage above and/or at 253 V is detected, the power consumption of the energy system 6 is increased and/or the power output of the energy system 6 is reduced. This advantageously has a positive effect on the line voltage, such that it ideally returns to its normal range between 203 V and 253 V.

Figure 2:
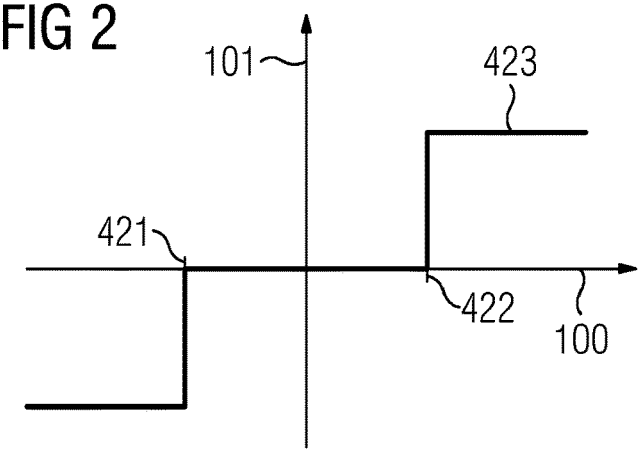
FIG. 2 shows a diagram of a characteristic curve.

FIG. 2 shows a diagram of an advantageous characteristic curve 423. On the abscissa 100 of the diagram, the difference $u(t)-u_0$ is plotted in arbitrary units, wherein $u(t)$ indicates the line voltage detected at a time t and $u_0$ the set point of the line voltage. On the ordinate 101, the value of the characteristic curve 423, which in the present case is dimensionless, is plotted.

In some embodiments, the characteristic curve 423 can be provided for a power consumption and/or power output. The power or energy exchange is controlled by means of the characteristic curve 423 or based on this by $P_{in/out}(u(t))=\overline{P}_{in/out} \cdot [1-\text{sgn}(P_{in/out}) \cdot f_{in/out}(u(t)-u_0)]$. In this case, the power consumption $P_{in}$ is to be considered positive and the power output as $P_{out}$ negative with respect to the energy system 6. In other words, $\text{sgn}(P_{in})=1$ and $\text{sgn}(P_{out})=1$. In some embodiments, $f_{in}=f_{out}$, as represented.

In some embodiments, the characteristic curve 423 represented has the functional representation $f_{in/out}(u(t)-u_0)=-F_1 \Theta(u_1-u(t))+F_2 \Theta(u(t)-u_2)$, wherein $\Theta$ indicates the Heaviside function which is defined by $\Theta(x)=0$ for $x<0$ and $\Theta(x)=1$ for $x \geq 0$. Moreover, $u_1$ indicates the first threshold value 421 and $u_2$ the second threshold value 422.

Figure 3:
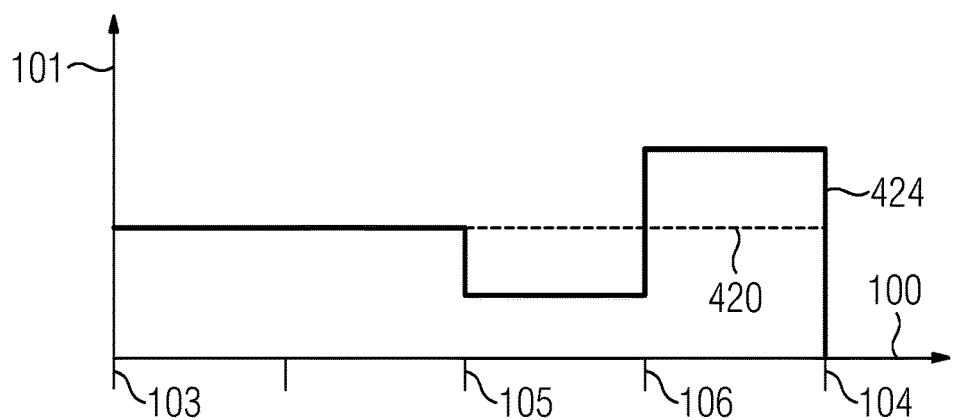
FIG. 3 shows a diagram of an exemplary temporal course of a power consumption.

FIG. 3 shows a diagram of an exemplary temporal course 424 of a power consumption. On the abscissa 100 of the diagram, time is plotted in arbitrary units. On the ordinate 101 of the diagram, the power consumption is plotted in arbitrary units. The course 424 or rather the curve 424 illustrates the temporal course 424 of the power consumption.

Moreover, a time range T is represented which is limited by a starting time 103 and an end time 104. In other words, $T=[t_0, t_1]$, wherein $t_0$ identifies the starting time 104 and $t_1$ the end time. An amount of energy $E_T$ should be consumed by the energy system 6 within the time range T. In other words, the amount of energy $E_T$ should be supplied to the energy system 6 via the low-voltage network 2. This corresponds to an average power consumption $\overline{P}_{in}=E_T/T$ which is symbolized by the dashed curve 420. The power consumption of the energy system 6 typically takes place with essentially constant power which corresponds to the average power.

At a time 105, the detected line voltage is below the first threshold value 421. As a result, the control apparatus 42 reduces the power consumption in relation to the average power consumption 420. This is carried out until a second time 106. From the time 106, the power consumption is increased with respect to its average value 420, for example because a line voltage is above the second threshold value 422. In some embodiments, the amount of energy $E_T$ must be supplied to the energy system 6, so that after a time range of lower power consumption with respect to the average power consumption, there must always be a time range of increased power consumption with respect to the average power consumption within the time range T.

Despite the fact the teachings of the present disclosure are illustrated and described in greater detail by the exemplary embodiments, the scope of the disclosure is not limited by the disclosed examples or other variations can be derived from this by the person skilled in the art, without departing from the scope of protection.

LIST OF REFERENCE NUMBERS 2 low-voltage network
4 network connection point 6 energy system
42 control apparatus
61 components
100 abscissa
101 ordinate
103 starting time
104 end time
105 first time
106 second time
420 dashed line (average power)
421 first threshold value
422 second threshold value
423 characteristic curve
424 curve (temporal course of a power consumption)

What is claimed is:

1. A control apparatus for controlling a power consumption and/or a power output of an energy system via a network connection point of a voltage limited network, the control apparatus comprising:
   a voltage detector to detect a line voltage at the network connection point;
   wherein the network connection point connects the energy system to the voltage limited network;
   wherein the energy system includes an energy consumer and an energy source;
   a processor programmed to reduce the power consumption and/or to increase the power output if the line voltage is below a first threshold value and/or to increase the power consumption and/or to reduce the power output if the line voltage is above a second threshold value greater than the first threshold value;
   wherein the power consumption and/or power output varies according to $P\_(in/out)\ (u(t)) = P^-\_(in/out) \cdot [1 - \text{sgn}(P\_(in/out)) \cdot f\_(in/out)\ (u(t) - u\_0)]$,
   $u(t)$ represents the detected line voltage,
   $u\_0$ represents a set point of the line voltage,
   $P^-\_in$ represents an average power consumption, and
   $f\_(in/out)$ represents a respective characteristic curve of the control,
   in each case $f\_(in/out)\ (u(t) - u\_0) = -F\_1\ \Theta(u\_1 - u(t)) + F\_2\ \Theta(u(t) - u\_2)$,
   $F\_1$ and $F\_2$ are constant and greater than zero; and
   $\Theta(x) = 0$ for $x < 0$ and $\Theta(x) = 1$ for $x \geq 0$.

2. The control apparatus as claimed in claim 1, wherein:
   the power consumption varies according to $P\_in\ (u(t)) = P^-\_in \cdot [1 + f\_in\ (u(t) - u\_0)]$;
   $u(t)$ represents the detected line voltage,
   $u\_0$ represent a set point of the line voltage,
   $P^-\_in$ represents an average power consumption (420),
   $f\_in$ represents a characteristic curve (423) of the control, and
   $f\_in\ (u(t) - u\_0) < 0$ if the line voltage is below the first threshold value (421), and
   $f\_in\ (u(t) - u\_0) > 0$ if the line voltage is above the second threshold value.

3. The control apparatus as claimed in claim 1, wherein:
   the power output varies according to $P\_out\ (u(t)) = P^-\_out \cdot [1 - f\_out\ (u(t) - u\_0)]$,
   $u(t)$ represents the detected line voltage,
   $u\_0$ represents a set point of the line voltage,
   $P^-\_out$ represents an average power output, and
   $f\_out$ represents a characteristic curve of the control, and
   $f\_out\ (u(t) - u\_0) < 0$ if the line voltage is below the first threshold value, and
   $f\_out\ (u(t) - u\_0) > 0$ if the line voltage is above the second threshold value.

4. A method for controlling a power consumption and/or a power output of an energy system via a network connection point of a voltage limited network, the method comprising:
   detecting a line voltage of the voltage limited network at the network connection point;
   wherein the network connection point connects the energy system to the voltage limited network;
   wherein the energy system includes an energy consumer and an energy source;
   reducing the power consumption and/or increasing the power output if the line voltage is below a first threshold value; and/or
   increasing the power consumption and/or reducing the power output if the line voltage is above a second threshold value which is greater than the first threshold value according to $P\_in\ (u(t)) = P^-\_in \cdot [1 + f\_in\ (u(t) - u\_0)]$,
   wherein $u(t)$ represents the detected line voltage,
   $u\_0$ represents a set point of the line voltage,
   $P^-\_in$ represents an average power consumption (420), and
   $f\_in$ represents a characteristic curve (423) of the control, and
   $f\_in\ (u(t) - u\_0) < 0$ if the line voltage is below the first threshold value, and
   $f\_in\ (u(t) - u\_0) > 0$ if the line voltage is above the second threshold value;
   wherein the power consumption and/or power output varies according to $P\_(in/out)\ (u(t)) = P^-\_(in/out) \cdot [1 - \text{sgn}(P\_(in/out)) \cdot f\_(in/out)\ (u(t) - u\_0)]$,
   $u(t)$ represents the detected line voltage,
   $u\_0$ represents a set point of the line voltage,
   $P^-\_in$ represents an average power consumption, and
   $f\_(in/out)$ represents a respective characteristic curve of the control,
   in each case $f\_(in/out)\ (u(t) - u\_0) = -F\_1\ \Theta(u\_1 - u(t)) + F\_2\ \Theta(u(t) - u\_2)$,
   $F\_1$ and $F\_2$ are constant and greater than zero; and
   $\Theta(x) = 0$ for $x < 0$ and $\Theta(x) = 1$ for $x > 0$.

5. The method as claimed in claim 4, further comprising controlling the power consumption and/or the power output so the amount of energy which is exchanged via the network connection point within a time range is equal to a specified amount of energy.

6. A method for controlling a power consumption and/or a power output of an energy system via a network connection point of a voltage limited network, the method comprising:
   detecting a line voltage of the voltage limited network at the network connection point;
   wherein the network connection point connects the energy system to the voltage limited network;
   wherein the energy system includes an energy consumer and an energy source;
   reducing the power consumption and/or increasing the power output if the line voltage is below a first threshold value; and/or
   increasing the power consumption and/or reducing the power output if the line voltage is above a second threshold value which is greater than the first threshold value according to $P\_out\ (u(t)) = P^-\_out \cdot [1 - f\_out\ (u(t) - u\_0)]$,
   wherein $u(t)$ represents the detected line voltage,
   $u\_0$ represents a set point of the line voltage,
   $P^-\_out$ represents an average power output, and
   $f\_out$ represents a characteristic curve of the control, $f\_out\,(u(t)-u\_Soll)<0$ if the line voltage is below the first threshold value, and $f\_out\,(u(t)-u\_0)>0$ if the line voltage is above the second threshold value;

wherein the power consumption and/or power output varies according to $P\_(in/out)\,(u(t))=\bar{P}\_(in/out)\cdot[1-sgn(P\_(in/out))\cdot f\_(in/out)\,(u(t)-u\_0)]$, $u(t)$ represents the detected line voltage, $u\_0$ represents a set point of the line voltage, $\bar{P}\_in$ represents an average power consumption, and $f\_(in/out)$ represents a respective characteristic curve of the control, in each case $f\_(in/out)\,(u(t)-u\_0)=-F\_1\,\Theta(u\_1-u(t))+F\_2\,\Theta(u(t)-u\_2)$, $F\_1$ and $F\_2$ are constant and greater than zero; and $\Theta(x)=0$ for $x<0$ and $\Theta(x)=1$ for $x\geq 0$.

7. A method for controlling a power consumption and/or a power output of an energy system via a network connection point of a voltage limited network, the method comprising:

detecting a line voltage of the voltage limited network at the network connection point;

wherein the network connection point connects the energy system to the voltage limited network;

wherein the energy system includes an energy consumer and an energy source;

reducing the power consumption and/or increasing the power output if the line voltage is below a first threshold value; and/or increasing the power consumption and/or reducing the power output if the line voltage is above a second threshold value which is greater than the first threshold value according to $P\_(in/out)\,(u(t))=\bar{P}\_(in/out)\cdot[1-sgn(P\_(in/out))\cdot f\_(in/out)\,(u(t)-u\_0)]$, wherein $u(t)$ represents the detected line voltage, $u\_0$ represents a set point of the line voltage, $\bar{P}\_in$ represents an average power consumption, and $f\_(in/out)$ a respective characteristic curve of the control, wherein in each case $f\_(in/out)\,(u(t)-u\_0)=-F\_1\,\Theta(u\_1-u(t))+F\_2\,\Theta(u(t)-u\_2)$, and $F\_1$ and $F\_2$ are constant and greater than zero;

wherein the power consumption and/or power output varies according to $P\_(in/out)\,(u(t))=\bar{P}\_(in/out)\cdot[1-sgn(P\_(in/out))\cdot f\_(in/out)\,(u(t)-u\_0)]$, $u(t)$ represents the detected line voltage, $u\_0$ represents a set point of the line voltage, $\bar{P}\_in$ represents an average power consumption, and $f\_(in/out)$ represents a respective characteristic curve of the control, in each case $f\_(in/out)\,(u(t)-u\_0)=-F\_1\,\Theta(u\_1-u(t))+F\_2\,\Theta(u(t)-u\_2)$, $F\_1$ and $F\_2$ are constant and greater than zero; and $\Theta(x)=0$ for $x<0$ and $\Theta(x)=1$ for $x\geq 0$.

\* \* \* \* \*